United States Patent
Shah et al.

(10) Patent No.: US 11,138,220 B2
(45) Date of Patent: Oct. 5, 2021

(54) GENERATING DATA TRANSFORMATION WORKFLOWS

(71) Applicant: Amazon Technologies, Inc., Seattle, WA (US)

(72) Inventors: Mehul A. Shah, Saratoga, CA (US); George Steven McPherson, Seattle, WA (US); Prajakta Datta Damle, San Jose, CA (US); Gopinath Duddi, San Jose, CA (US); Anurag Windlass Gupta, Atherton View, CA (US); Benjamin Albert Sowell, Mountain View, CA (US); Bohou Li, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 15/385,764

(22) Filed: Dec. 20, 2016

(65) Prior Publication Data

US 2018/0150528 A1   May 31, 2018

Related U.S. Application Data

(60) Provisional application No. 62/426,571, filed on Nov. 27, 2016.

(51) Int. Cl.
| | | |
|---|---|---|
| *G06F 17/00* | (2019.01) | |
| *G06F 16/25* | (2019.01) | |
| *G06F 16/28* | (2019.01) | |

(52) U.S. Cl.
CPC ......... *G06F 16/254* (2019.01); *G06F 16/282* (2019.01)

(58) Field of Classification Search
CPC . G06N 3/00; G06N 5/00; G05B 13/00; G06F 16/13; G06F 16/24; G06F 16/156; G06F 16/283
See application file for complete search history.

(56) References Cited

U.S. PATENT DOCUMENTS

| | | |
|---|---|---|
| 8,136,158 B1 | 3/2012 | Sehr et al. |
| 8,752,047 B2 | 6/2014 | Banga et al. |
| 8,788,931 B1 * | 7/2014 | Chen ................... G06F 17/2264 715/234 |
| 9,430,114 B1 * | 8/2016 | Dingman ................ G06F 3/048 |
| 9,471,775 B1 | 10/2016 | Wagner et al. |
| 9,684,785 B2 | 6/2017 | Walsh |

(Continued)

OTHER PUBLICATIONS

U.S. Appl. No. 15/385,777, filed Dec. 20, 2016, Mehul A. Shah et al.

(Continued)

*Primary Examiner* — Hung D Le
(74) *Attorney, Agent, or Firm* — Robert C. Kowert; Kowert, Hood, Munyon, Rankin & Goetzel, P.C.

(57) ABSTRACT

Data transformation workflows may be generated to transform data objects. A source data schema for a data object and a target data format or target data schema for a data object may be identified. A comparison of the source data schema and the target data format or schema may be made to determine what transformations can be performed to transform the data object into the target data format or schema. Code to execute the transformation operations may then be generated. The code may be stored for subsequent modification or execution.

20 Claims, 11 Drawing Sheets

(56) References Cited

U.S. PATENT DOCUMENTS

| | | | |
|---|---|---|---|
| 9,898,515 B1* | 2/2018 | Avagyan | G06F 16/254 |
| 2002/0059566 A1* | 5/2002 | Delcambre | G06F 40/151 |
| | | | 717/146 |
| 2003/0196193 A1 | 10/2003 | Kuzmin | |
| 2005/0097561 A1* | 5/2005 | Schumacher | G06F 8/10 |
| | | | 718/106 |
| 2005/0273772 A1* | 12/2005 | Matsakis | G06F 8/41 |
| | | | 717/136 |
| 2005/0283622 A1 | 12/2005 | Hall et al. | |
| 2007/0203719 A1 | 8/2007 | Kenagy et al. | |
| 2007/0203923 A1* | 8/2007 | Thomas | G06F 16/86 |
| 2007/0266426 A1 | 11/2007 | Iyengar et al. | |
| 2008/0052534 A1 | 2/2008 | Harada et al. | |
| 2008/0104014 A1 | 5/2008 | Burger et al. | |
| 2009/0177671 A1 | 7/2009 | Pellegrini et al. | |
| 2009/0192979 A1 | 7/2009 | Lunde | |
| 2010/0058291 A1 | 3/2010 | Hahn et al. | |
| 2010/0274750 A1 | 10/2010 | Oltean et al. | |
| 2011/0023028 A1 | 1/2011 | Nandagopal et al. | |
| 2011/0107383 A1 | 5/2011 | Barton et al. | |
| 2011/0154431 A1 | 6/2011 | Walsh | |
| 2012/0042162 A1 | 2/2012 | Anglin et al. | |
| 2012/0054744 A1 | 3/2012 | Singh et al. | |
| 2012/0203877 A1 | 8/2012 | Bartholomay et al. | |
| 2013/0167222 A1 | 6/2013 | Lewis | |
| 2013/0290928 A1 | 10/2013 | Johnson | |
| 2015/0100542 A1 | 4/2015 | Li et al. | |
| 2015/0113009 A1 | 4/2015 | Zhou et al. | |
| 2015/0286701 A1 | 10/2015 | Wideman | |
| 2015/0347539 A1* | 12/2015 | Holmes | G06F 16/972 |
| | | | 707/602 |
| 2015/0347541 A1 | 12/2015 | Holmes et al. | |
| 2015/0356293 A1 | 12/2015 | Biswas | |
| 2016/0180084 A1 | 6/2016 | Spurlock et al. | |
| 2016/0224360 A1 | 8/2016 | Wagner et al. | |
| 2016/0224785 A1 | 8/2016 | Wagner et al. | |
| 2016/0246809 A1* | 8/2016 | Romano | G06F 16/119 |
| 2016/0259628 A1 | 9/2016 | Schuchman et al. | |
| 2016/0360009 A1 | 12/2016 | Borley et al. | |
| 2017/0091673 A1* | 3/2017 | Gupta | G06N 5/022 |
| 2017/0126795 A1 | 5/2017 | Kumar et al. | |
| 2017/0154019 A1* | 6/2017 | Filipsk | G06F 17/227 |
| 2017/0213037 A1 | 6/2017 | Toledano et al. | |
| 2017/0220613 A1* | 8/2017 | Gass | G06F 16/2282 |
| 2018/0039490 A1* | 2/2018 | Gass | G06F 8/427 |
| 2018/0129497 A1 | 5/2018 | Biddle et al. | |
| 2018/0157703 A1 | 6/2018 | Wang et al. | |
| 2018/0157842 A1 | 6/2018 | Holz et al. | |
| 2018/0189350 A1 | 7/2018 | Imaki | |
| 2018/0189510 A1 | 7/2018 | Seko | |
| 2018/0276781 A1 | 9/2018 | Oliveria et al. | |

OTHER PUBLICATIONS

International Search Report and Written Opinion from PCT/US2017/063259, dated Jan. 25, 2018, Amazon Technologies, Inc., pp. 1-19.
Bratko, A. et al., "Exploiting Structural Information for semi-structured document categorization", Information Processing & Management, Dated May 1, 2006, vol. 42, No. 3, pp. 679-694.
Juan Trujillo et al., "A UML Based Approach for Modeling ETL Processes in data warehouses", In: Network and parallel computing, dated Oct. 16, 2003, pp. 1-14.
Anonymous, "Start informatica job when a row is updated", retrieved from URL: https://network.informatica.com/thread/13920. on Jan. 10, 2018. pp. 1-5.
Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.
Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.

* cited by examiner

GENERATING DATA TRANSFORMATION WORKFLOWS

RELATED APPLICATIONS

This application claims benefit of priority to U.S. Provisional Application Ser. No. 62/426,571, entitled "Generating Data Transformation Workflows," filed Nov. 27, 2016, and which is incorporated herein by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data formats that offer different processing or maintenance capabilities. However, introducing multiple data formats is not without cost. Data is often processed by different systems which may not support the current data format of the data. Thus, the ability to transform data between different formats is desirable.

Figure 1A:
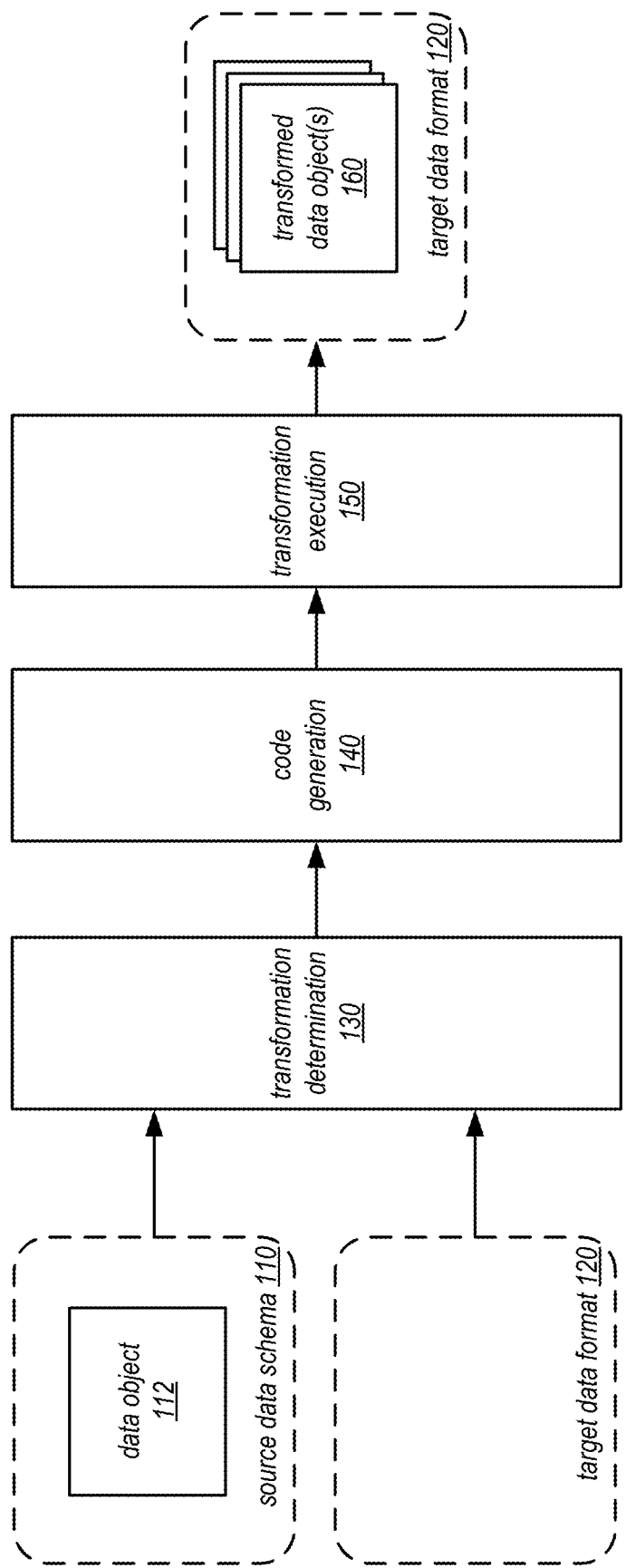
FIG. 1A illustrates a logical block diagram of generating data transformation workflows, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of generating data transformation workflows are described herein. Increasing numbers of data storage and processing systems have encouraged a diverse set of data formats for storing data objects. Some data formats offer structured data schemas, like relational table formats and other data formats may provide semi-structured or unstructured data schemas, like groupings or collections of items in a non-relational database. Storing data objects according to different data formats offers entities that manage data opportunities to optimize the way data is stored for maintaining or processing the data. However, as data is often shared amongst different systems for processing that may not support the same data formats, data transformation from one data format to another is often performed to make data more widely available to different systems.

Because data formats may vary widely, transformation of the data from one format to another is often a burdensome task. For instance, the differences between a source data schema and a target data schema or format may need to be discovered in order to determine what transformations should be performed to achieve the desired result. Due to the many possible combinations of source and target data schema or formats, such determinations often require developers to manually generate custom transformation workflows that apply a series of transformations to achieve the desired result. Such work increases the cost of making data widely available in terms of development costs and lag time in effecting the desired transformation. Moreover, as new data formats continue to be introduced, technical knowledge and skills must be updated or acquired in order to generate new transformation workflows involving new data formats.

In various embodiments, data transformation workflows may be generated automatically to transform data stored in a source data schema (and format) to a target data format. In this way, the development costs of transformation workflow creation are significantly reduced. Automating generation of transformation workflows may also increase the speed at which data transformation can be executed, reducing the lag time between determining that a transformation is desired and being able to execute the desired transformation. FIG. 1 illustrates a logical block diagram of generating data transformation workflows, according to some embodiments.

Data object 112 may be any form of data or data structure, (e.g., file, directory, database table, log, block, partition, chunk, or range of bytes). Data object 112 may be stored in a data store (e.g., in persistent block-based storage devices in some embodiments, such as hard disk drives, or in a volatile data store in other embodiments, such as system memory components). Data object 112 may be stored according to a source data schema 110. A data schema, like source data schema 110, may include different types of structural information (e.g., number of columns or objects in the data object, data types in the data object, data structures or arrangement of values in the data object, expected values (e.g., default values or expressions for determining a value), key data values, presence of or inclusion logical or physical partitioning or sharding of data, and/or any other data that may be used to access or to process the data of data object 112. For example, source data schema 110 may indicate that there are 5 columns of data in data object 112, with the first column being a integer value to store a user identifier, and the remaining 4 columns are string values storing other data. In addition to the data schema of data objects, the data format of data objects may be known. Data format may be the encoding of the data object, such as a file type for data, including, but not limited structured file types (e.g., column-oriented relational file types, row-oriented relational file types), semi-structured file types (e.g., Comma Separated Value (CSV) file types or Extensible Markup Language (XML)), or unstructured file types (e.g., media file types or text file types). For example, the source data format for data object 112 may be a CSV file, indicating that the fields of data in entries (e.g., rows) of the table are separated by columns. Further examples of data formats and data schemas are discussed below with regard to FIG. 1B.

Target data format 120 may be a different data format than a source data format for data object 112. For example, the file type may be different (e.g., Optimized Row Columnar (ORC) file format for target data format 120 and Parquet columnar format for data object 112). In some embodiments, the data schema or structure may be different (e.g., different number of columns, different data values, different aggregation or separation of data values, etc.). In some embodiments, a target data schema for data object 112 may also be identified. The target data schema for data object 112 may be different than source data schema 110. For example, some data values from source data schema 110 may be dropped, deleted, modified or converted in a target data schema (e.g., data values in one currency may be converted to data values in another currency). Thus, in some embodiments, instead of or in addition to target data format 120, a transformation workflow may be generated to transform data from the source data schema 110 to a target data schema (which may then be stored according to a same or different data format). For instance, data object 112 may be stored in an ORC file with a data schema of 6 columns and the target data schema may only include 4 columns. The transformation workflow may store the transformed data object as an ORC file. In embodiments where the target data schema is specified and the target data format is not specified, an identification, determination, or selection from amongst multiple possible data formats may be performed (e.g. selection from amongst multiple column oriented data formats). For example, a data format could be selected that results in the smallest data object or a data format could be selected that is most widely supported by different data processing engines.

Transformation determination 130 may identify or otherwise obtain the source data schema 110 and target data format 120 (and/or target data schema) in order to compare the source data schema and target data format and/or schema to determine one or more transformations to be applied to data object 112 to transform the data object into target data format 120 (and/or target data schema). For example, a rules-based comparison may be performed, in some embodiments, to perform file type comparisons to identify different features of the file type of target data format (e.g., different header or metadata information included in the target data format, different delimiters or mechanisms for denoting data values, etc.). Transformations to effect these different features may be correspondingly selected (e.g., transformations to rewrite, insert, or modify headers or metadata information, transformations to apply different delimiters, etc.). Differences in the source data schema 110 and a target data schema may indicate transformations to aggregate, combine, group, split, separate, rearrange, or restructure the location of data values (e.g., changing the mapping of data values to columns, combining values from fields into a single field, or relationalize or de-relationalize the form of data values). Differences in the source data schema 110 and a target data schema may indicate transformations to delete, select, filter, modify, convert, or change the data values of the data object.

An ordering of transformations may be determined, in various embodiments. For example, dependencies between selected transformations may be analyzed (e.g., by determining whether a transformation is dependent upon the performance of another transformation) to determine an order in which transformations should be performed. Other operations, such as operations to establish connections with a data store maintaining the data object or a data store to maintain transformed data object(s) may be included in the workflow.

The determined transformations may be identified to code generation 140 which may generate code in a coding language or script to execute the transformations of the workflow. For example, code generation 140 may implement a library of predefined transformations to be performed, assemble code from the library, and populate parameters, inputs, outputs, or other arguments for the transformations based on the determined transformations, dependencies between transformations, source data schema, and target data format and/or schema. In one embodiment, code generation 140 may provide the code in different languages or scripts (e.g., in response to a request to generate code specified language or script).

Figure 4:
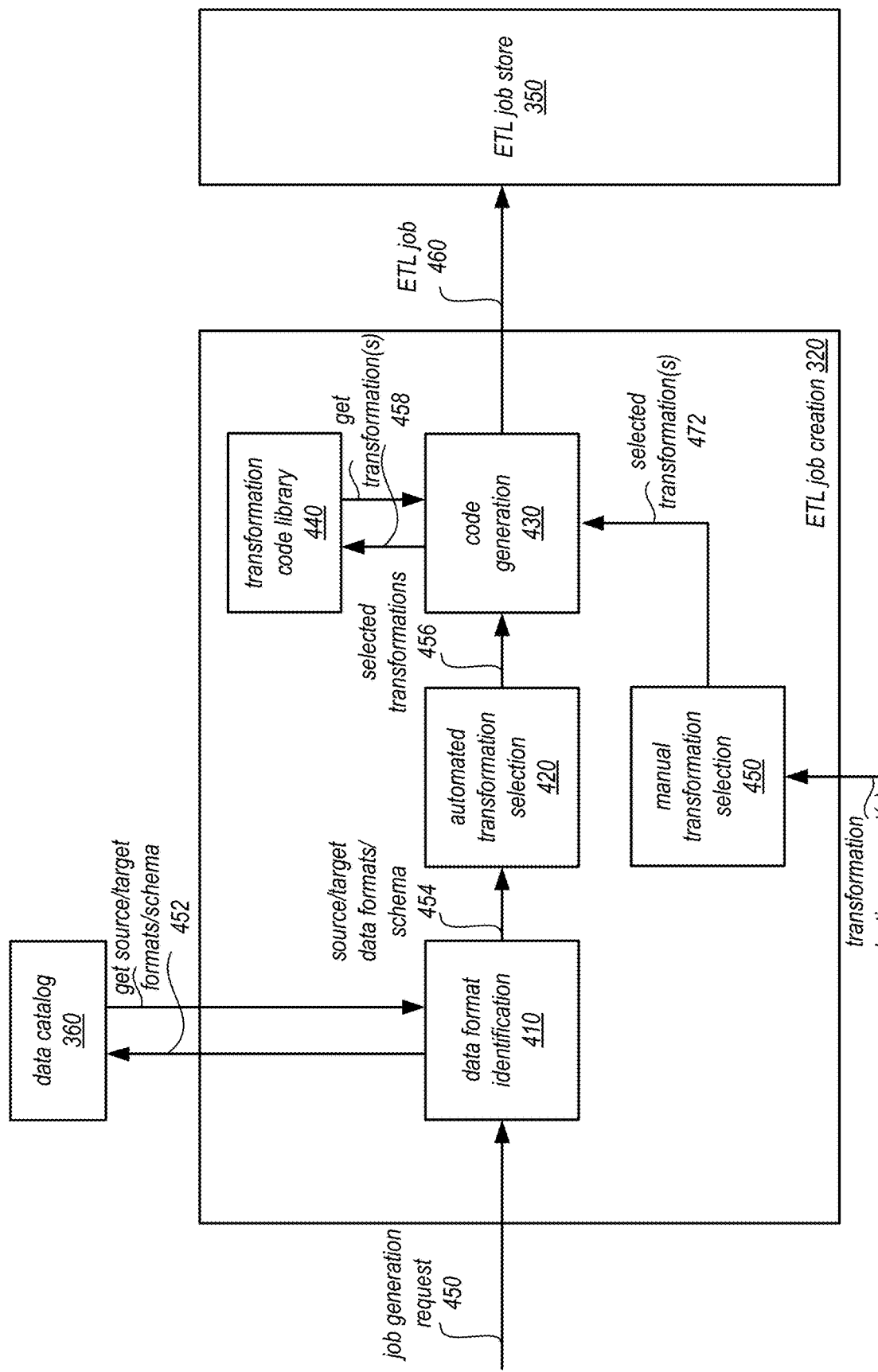
FIG. 4 is a logical block diagram illustrating ETL job creation, according to some embodiments.

The generated code may be stored, as discussed below with regard to FIG. 4, and modified upon request, as discussed below with regard to FIGS. 5A-6. In some embodiments, a graph may be generated representing the transformations and other operations which may be provided via an interface to users, as discussed below with regard to FIG. 6. The stored or modified code may be provided to transformation execution 150 which may compile, interpret, or otherwise perform the code to apply the determined transformations to data object 112. The transformation into target data format 120 and/or schema may result in one or multiple transformed data objects 120 being created. The transformed data object(s) 160 may be stored in the same data store as data object 112 or in a different data store.

Please note that the previous description of generating data transformation workflows is a logical illustration and thus is not to be construed as limiting as to the architecture for implementing a data store, data objects, transformation determination, code generation, or transformation execution.

Figure 1B:
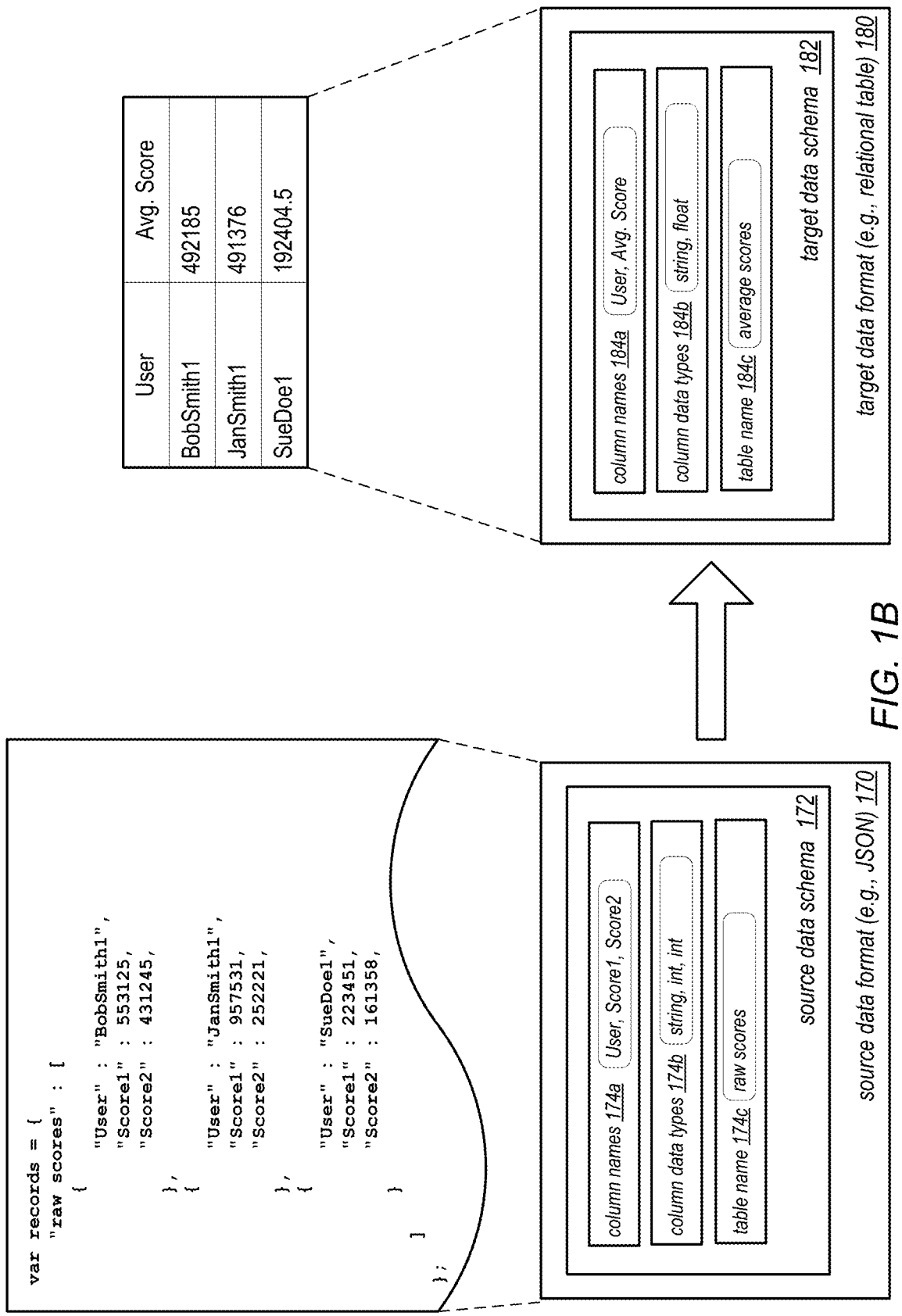
FIG. 1B illustrates a transformed data object according to a data transformation workflow, according to some embodiments.

FIG. 1B illustrates a transformed data object according to a data transformation workflow, according to some embodiments. A source data object may be stored according to a source data format 170, such as a JavaScript Object Notation (JSON) file) and source data schema 172. Source data schema 172 may describe a table, with table name 174*c* "raw scores," column names 174*a* "User," "Score1," "Score2," and column data types 174*b* "string," "integer," "integer." In different embodiments, different transformation targets may be used to generate a data transformation workflow. Target data format 180 may be provided, in some embodiments. For example, target data format 180 may be a relational database file, encoding the table described by source data schema 172 into a relational database file type, as depicted in FIG. 1B. The transformation target may also be target data schema 182. For example, target data schema 182 may specify a table name 184*c* of "average scores," columns names 184*a* of "User" and "Avg. Score," and column data types 184*b* of "string" and "float." The transformation workflow may be generated to perform the averaging of scores for users from source data schema 172 to target data schema 182, in some embodiments. Different transformation workflows may be generated for a source data object, such as transforming the source data object into transformed data object(s) of the same data schema in a different data format, the same data format with a different data schema, or a different data schema and a different data format. Thus, the transformation illustrated in FIG. 1B is not intended to be limiting.

This specification begins with a general description of a provider network that implements an Extract, Transform, Load (ETL) service that identifies, transforms, and moves data stored in the provider network or in external data stores. Then various examples of the ETL service including different components/modules, or arrangements of components/module that may be employed as part of implementing the ETL service are discussed. A number of different methods and techniques to implement generating data transformation workflows are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
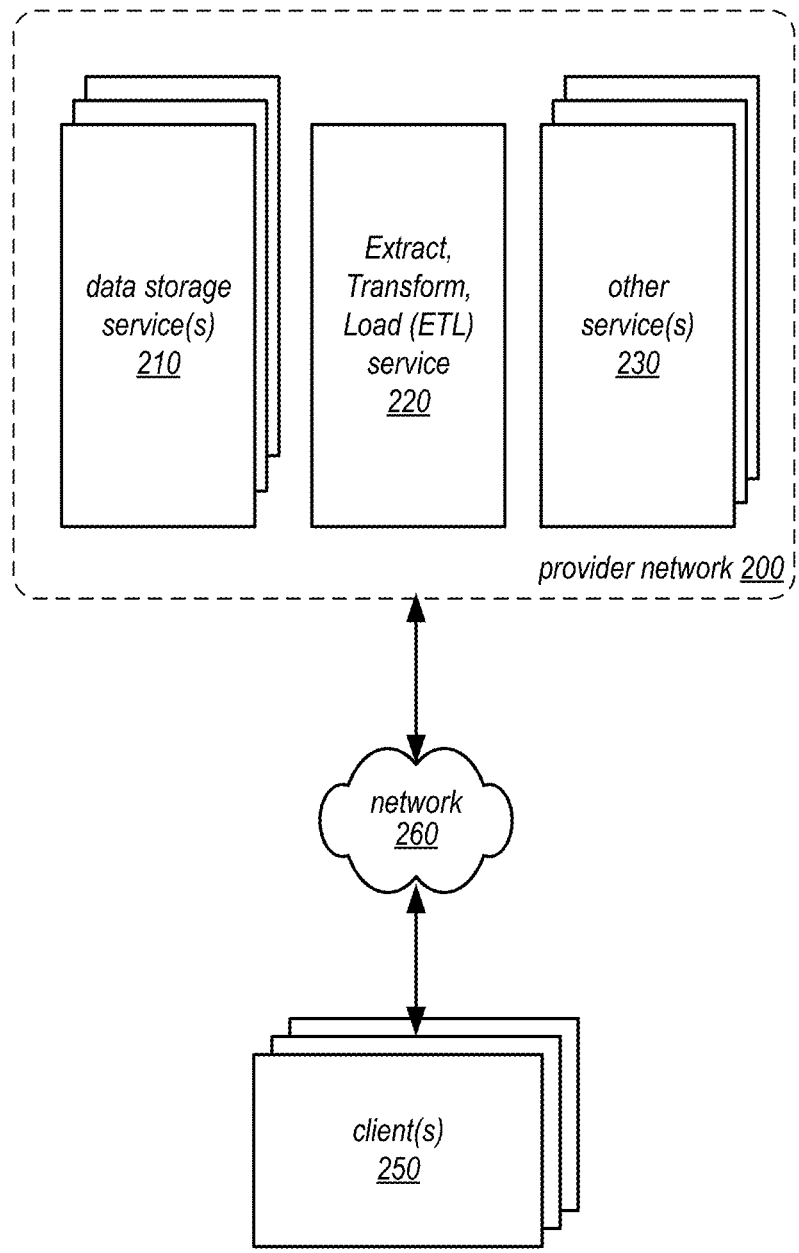
FIG. 2 is a block diagram illustrating a provider network offering different services including an extraction transformation loading (ETL) service that generates data transformation workflows, according to some embodiments.

FIG. 2 is a block diagram illustrating a provider network offering different services including an Extract, Transform, Load (ETL) service that generates data transformation workflows, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, ETL service 220 may create and dynamically update a catalog of data stored on behalf of clients in provider network 200 across the various data storage services 210, as discussed in detail below with regard to FIG. 3. For example, a database stored in a non-relational database format may be identified along with a logical container storing objects in an object-based data store as both being stored on behalf of a same customer of provider network 200. ETL service 220 may also perform ETL jobs that extract, transform, and load from one or more of the various data storage service(s) 210 to another location. For example, the ETL service may provide clients with the resources to create, maintain, and orchestrate data loading jobs that take one or more data sets, perform various transformation operations, and store the transformed data for further processing (e.g., by one or more of data processing service(s)). The ETL service may access a data catalog generated by ETL service 220 in order to perform an ETL operation (e.g., a job to convert a data object from one file type into one or more other data objects of a different file type). As discussed in detail below with regard to FIGS. 3-6, ETL service 220 may generate transformation workflows on behalf of clients automatically.

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job (e.g., a transformation workflow) to make data available for processing in a different location, data schema, or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of the various data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
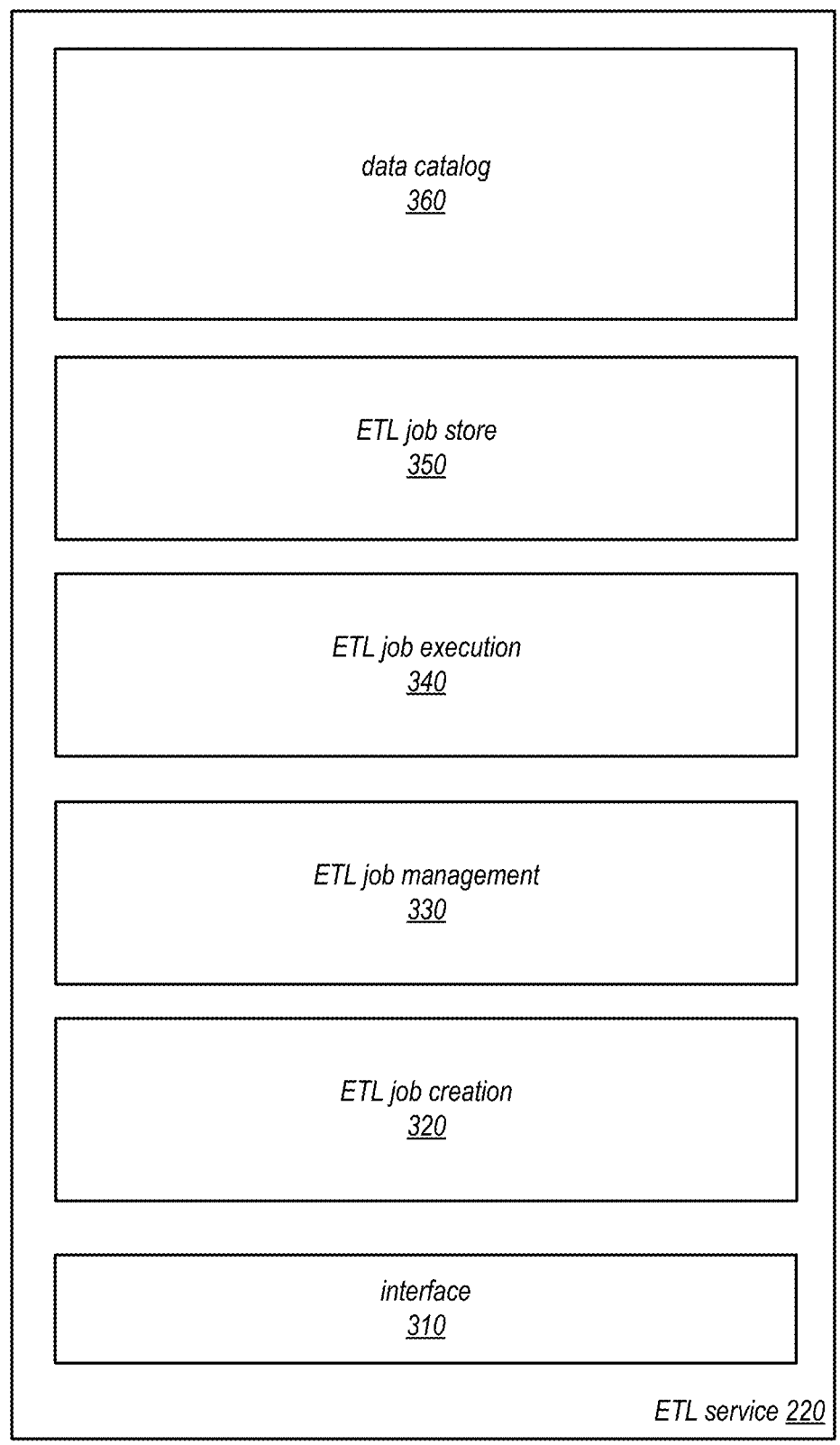
FIG. 3 is a block diagram illustrating an ETL service that generates data transformation workflows, according to some embodiments.

FIG. 3 is a block diagram illustrating an ETL service that generates data transformation workflows, according to some embodiments. ETL service 220 may provide access to data catalogs 360 and ETL jobs (for creation, management, and execution) via interface 310, which may be a programmatic interface (e.g., Application Programming Interface (API)), command line interface, and/or graphical user interface, in various embodiments.

ETL Service 220 may implement ETL job creation 320 to handle the creation of ETL jobs through manual job creation (e.g., creating, edit, or uploading ETL code or creating or editing graphs of ETL jobs) or through automated job creation, as discussed below with regard to FIG. 4. ETL service 220 may implement ETL job management 330 to provide clients with the ability to manage, edit, delete, or otherwise change ETL jobs, as discussed below with regard to FIGS. 5 and 6. ETL service 220 may implement ETL job execution 340 to provide an execution platform ETL jobs. In some embodiments, ETL job execution 340 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL job execution 340 may execute jobs, in some embodiments, automatically without any user editing changes to the automatically generated ETL code from ETL job creation 320. In some embodiments, ETL job execution 340 may execute the automatically generated ETL code for ETL jobs that were modified (as discussed below with regard to FIGS. 5A-6). ETL job execution 340 may execute jobs in response to detected triggering events for ETL jobs (which may be detected by ETL job management or another system or service monitoring for triggering event conditions).

ETL service 220 may maintain data catalogs 360 that describe data sets (stored in provider network 200 or in external storage locations). ETL service 220 may identify unknown data objects, identify a data format and data schema for the unknown data objects and store the data format and schema in a data catalog for the unknown data objects. ETL service 220 allow for catalog users, owners, or other stakeholders, to modify or otherwise manage data catalogs. For instance, ETL service 220 may process and execute access requests directed to data catalog(s) 360 (e.g., requests to combine, delete, or split tables of metadata in the catalog or edit the metadata determined for a data catalog) or requests to search or query for data objects using metadata describing the tables in the data catalog. ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Storage for data catalog(s) 360 may be implemented by one or more storage nodes, services, or computing devices (e.g., system 1000 discussed below with regard to FIG. 8) to provide persistent storage for data catalogs generated by data catalog service 200. Such storage nodes (or other storage components of storage 360) may implement various query processing engines or other request handling components to provide access to data catalogs according to requests received via interface 310. For example, data catalog storage may be implemented as a non-relational database, in one embodiment, that stores file types and other metadata for data objects in table. In some embodiments, a collections of metadata for various data objects stored across different storage service(s) 210 on behalf a single user account may be stored together in a single catalog of metadata for user data objects that may be made accessible to clients FIG. 4 is a logical block diagram illustrating ETL job creation, according to some embodiments. ETL job creation n320 may handle requests for automated ETL job creation and manual ETL job creation. For example, ETL job creation 320 may receive job generation request 450 which may specify the data object and target data format for the ETL job. Other job information, such as access credentials, triggering events, or any other information to execute the ETL job may be included as part of request 450. ETL job creation 320 may implement data format identification 410 to determine the source data format and/or data schema of the data object and the target data format and/or data schema of the data object. For example, in one embodiment, data format identification may get 452 the source and target data formats and schemas from data catalog 360. In another embodiment, data format identification 410 may perform data format or schema recognition techniques, or access other data stores (e.g., such as a data catalog stored in relational database) to retrieve the data format or schema information.

Data format identification 410 may provide the source and target data formats and/or data schema 454 to automated transformation selection 420 for comparison and transformation selection. Automated transformation selection 420 may implement a heuristics or rules-based comparison and transformation selection technique, in one embodiment. For example, automated transformation selection 420 may first identify a set of applicable rules for selecting transformations based on the source and target data formats (e.g., a rule set for transforming one column-oriented file format to another column oriented file format) or set of applicable rules for selecting transformations based on the source and target data schemas (e.g., identifying rules for performing filtering, aggregation, conversion of other transformations that can be identified as performed between the source and target data schemas). In some embodiments, automated transformation selection 420 may compare entire transformation workflows with the source and target data formats to select a best match workflow. For example, transformation workflows for converting a Javascript Object Notation (JSON) file into a relational table format may be identified and compared with the source and target formats for the job. Various other selection techniques or examples, as discussed below with regard to FIG. 7 may be implemented by automated transformation selection 420.

Automated transformation selection 420 may provide the selected transformations 456 to code generation 430. Code generation 430 may get code for specific transformations (or workflows of multiple transformations) from transformation code library 440 and construct the source code for executing the transformations 456. For example, an summation transformation to add the values from multiple data fields into a single value may be generated according to a summation function or operation defined or specified by code library 440. In some embodiments job generation request 450 may indicate a specified type of output source code (e.g., Python, Java, C#, etc.). Code generation 430 may include annotations, comments, or other indications in generated code to identify the transformations, which may be subsequently parsed and identified for generating a graph of the transformations, as discussed below with regard to FIGS. 5A and 5B.

Manual creation of ETL jobs may also utilize code generation 430. For example, transformation selection request(s) 470 may be received (e.g., via a graphical user interface) and provided by manual transformation selection handler 450 to code generation 430. Code generation 430 may take the manually selected transformations 472 and generate code to execute the transformations 472 and store the ETL job 460 in ETL job store 350.

Figure 5A:
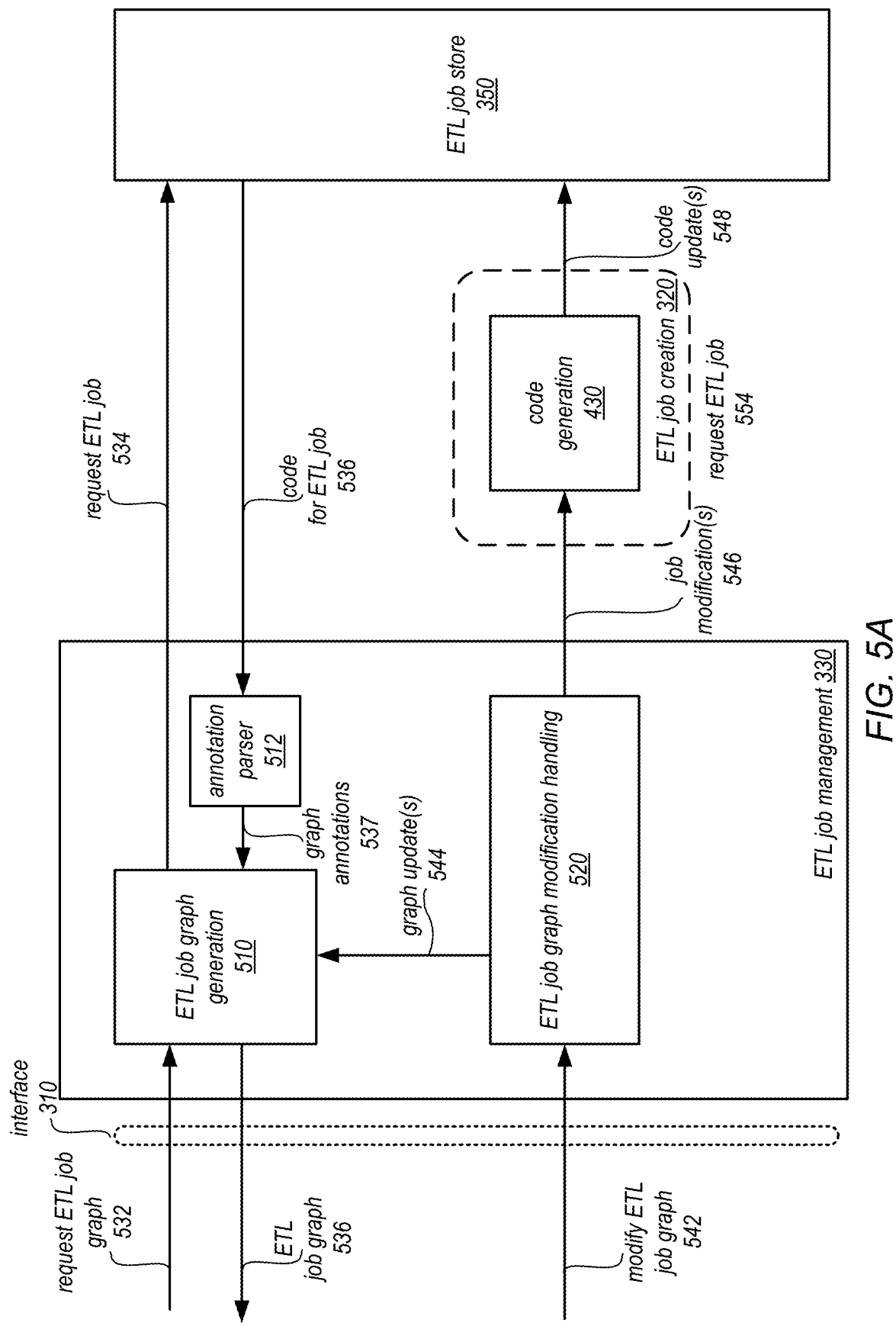
FIG. 5A is a logical block diagram illustrating interactions to modify an ETL job graph, according to some embodiments.

FIG. 5A is a logical block diagram illustrating interactions to modify an ETL job graph, according to some embodiments. ETL job management 330 may provide clients of ETL service 220 with the ability to modify the execution of ETL jobs, whether the jobs were created in automated fashion or manual fashion. The transformations as part of an ETL job may be provided as an ETL job graph (e.g., a directed acyclical graph of transformations) or as the source ETL code for executing the transformations of the ETL job. In FIG. 5A, ETL job management 330 may receive request for an ETL job graph 532 via interface 310. ETL job management 330 may send a request to ETL job store to retrieve the ETL job 534. For example, a job identifier, user account, or other identification may be provided to identify the correct job. The code for the ETL job may be provided 536 to annotation parser 512, which may scan and extract the transformations specified in the comments of the ETL code and provide the indicated graph annotations 537 to ETL job graph generation 510.

Figure 5B:
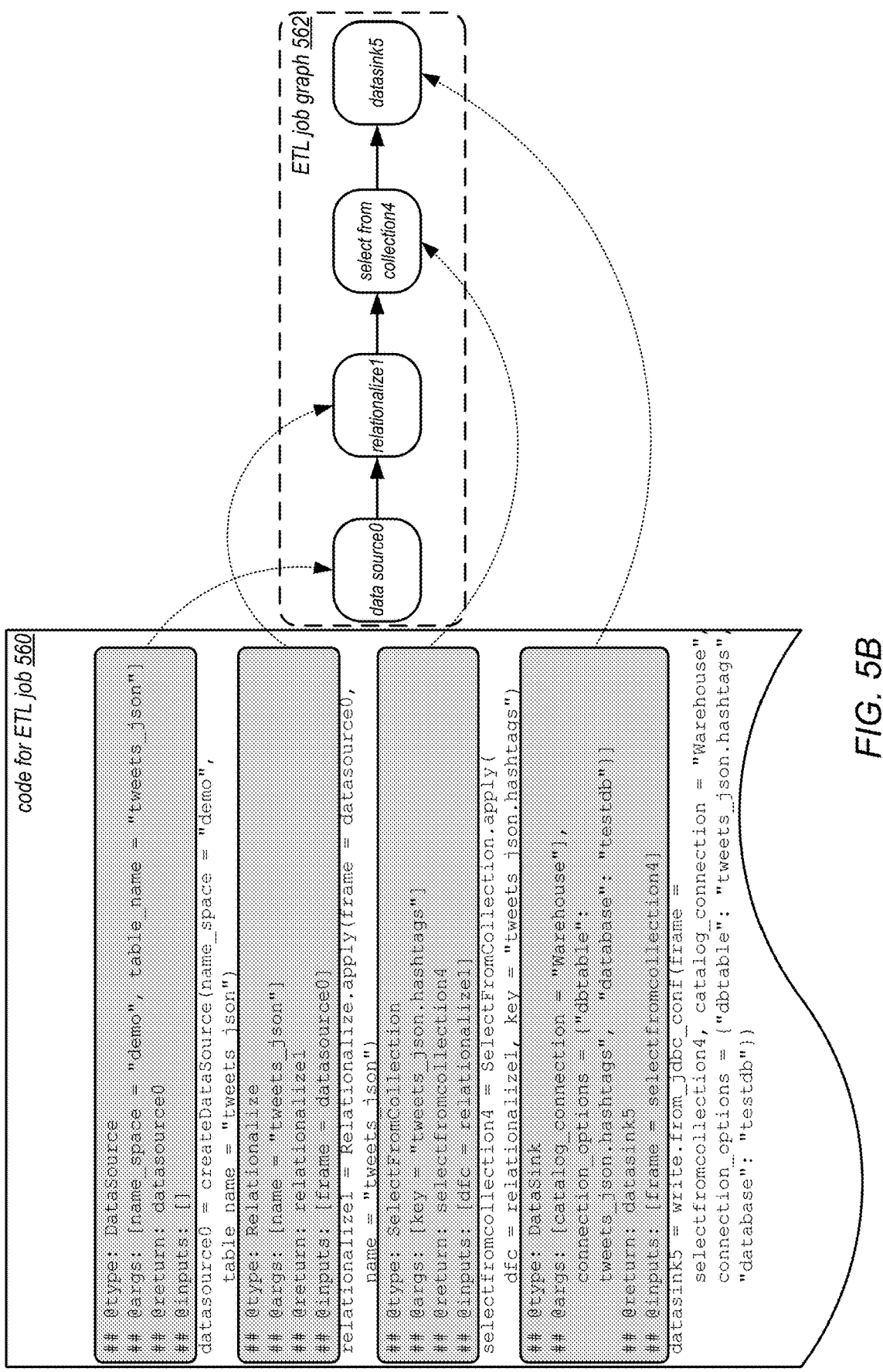
FIG. 5B is a logical diagram illustrating generation of an ETL job graph from ETL job code, according to some embodiments.

For example, in FIG. 5B, code for an ETL job 560 (e.g., represented as Python code for Spark, Pyspark), may include various comment sections (delineated by "##"). These annotations may include the type of transformation or operation, arguments input into the transformation or operation, the returned results, and the input data values (if applicable). For example, createDataSource operation may retrieve data from the data source table "tweets_json." The comment section proceeding the operation declaration in code 560 may be used to generate the corresponding node in ETL job graph 562. Similar mappings between comments for the relationalize transformation, selectFromCollection transformation, and the write operation to the target "Warehouse" may also be indicated according to the proceeding comment sections. These comments may be parsed by annotation parser 512, which may generate a document or other representation of the ETL job graph based on the identified transformations (e.g., in a JSON document identifying nodes and edges for the ETL job graph). The representations of graph annotations 537 may then be provided to ETL job graph generation 510 which may generate the job graph according to the annotations that illustrates the transformations to be performed in the ETL job (such as ETL job graph 562 in FIG. 5B). The generated graph may then be provided 538 (e.g., for display via a graphical use interface) or as data that may be interpreted by a client to display as a graph.

Updates to the ETL job may be received as updates to the ETL graph. As illustrated in FIG. 5A, a request to modify the ETL job graph 542 may be received via interface 310. ETL job graph handling 520 may determine the modification to the graph (e.g., transformation input change, transformation replaced, transformation deleted, transformation added, ordering of transformation changed, etc.). ETL job graph modification handling 520 may provide graph update(s) 544 to ETL job graph generation 510 so that an updated version based on the modifications 542 may be generated and provided 536. To update the underlying code, ETL job graph modification handling 520 may send job modification(s) 546 to code generation 430 (implemented as part of ETL job creation 320). Code generation 430 may generate updated portions of code according to the job modification(s) 546 and send the code update(s) 548 to ETL job store 350. Code generation 430 may then store the ETL job 460 in ETL job store 350.

Figure 5C:
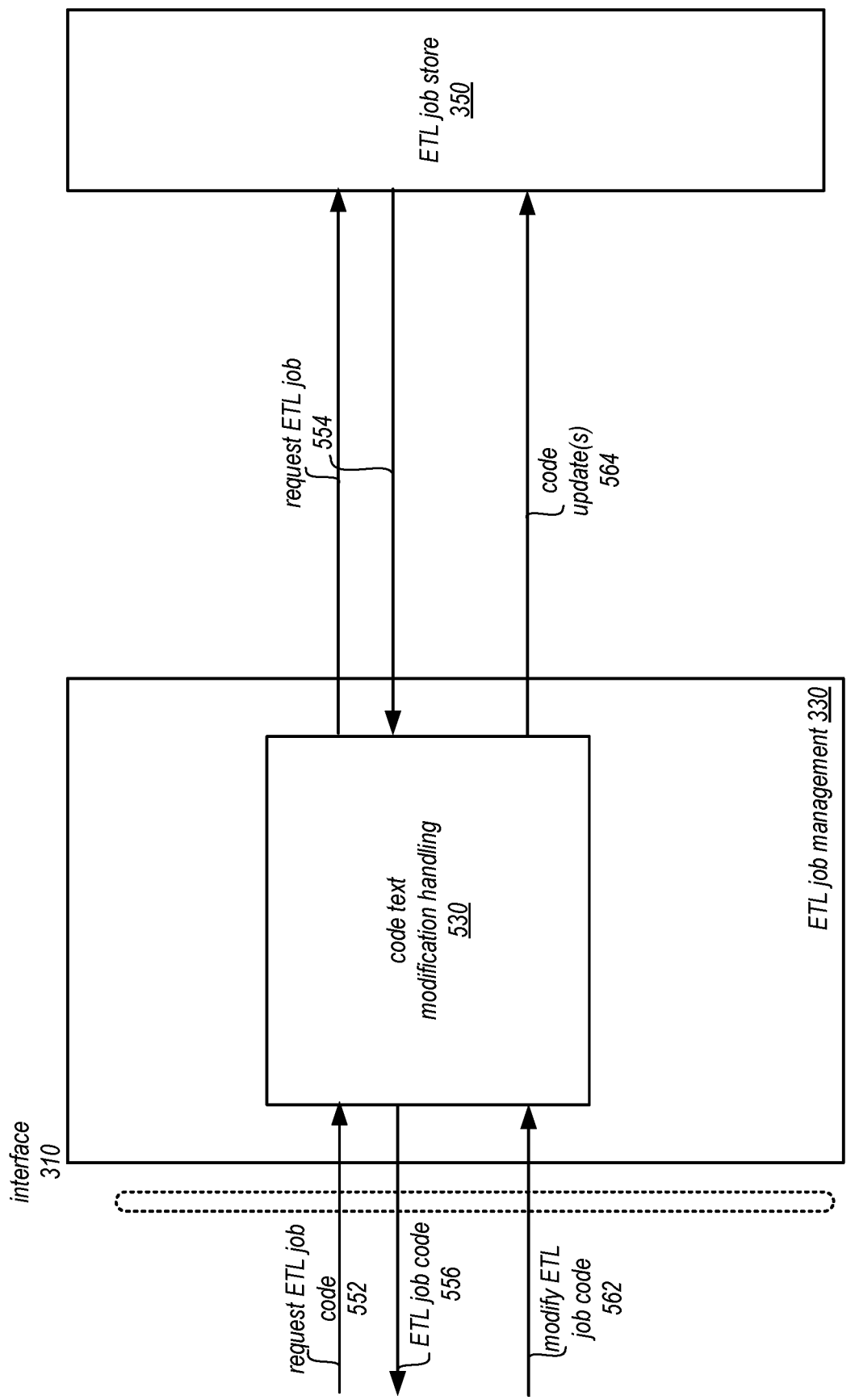
FIG. 5C is a logical block diagram illustrating interactions to modify ETL job code, according to some embodiments.

In some embodiments, ETL job code may be edited directly. FIG. 5C is a logical block diagram illustrating interactions to modify ETL job code, according to some embodiments. For example, ETL job management 330 may implement code modification handling 530 to handle requests for ETL job code 552, retrieve the request ETL job 554 from ETL job store 350 and provide the ETL job code 556 to a requesting client. Code modification handling 530 may handle textual edits to the ETL job code, as indicated at 562, and provide corresponding code update(s) 564 to the job in ETL job store 350.

Figure 6:
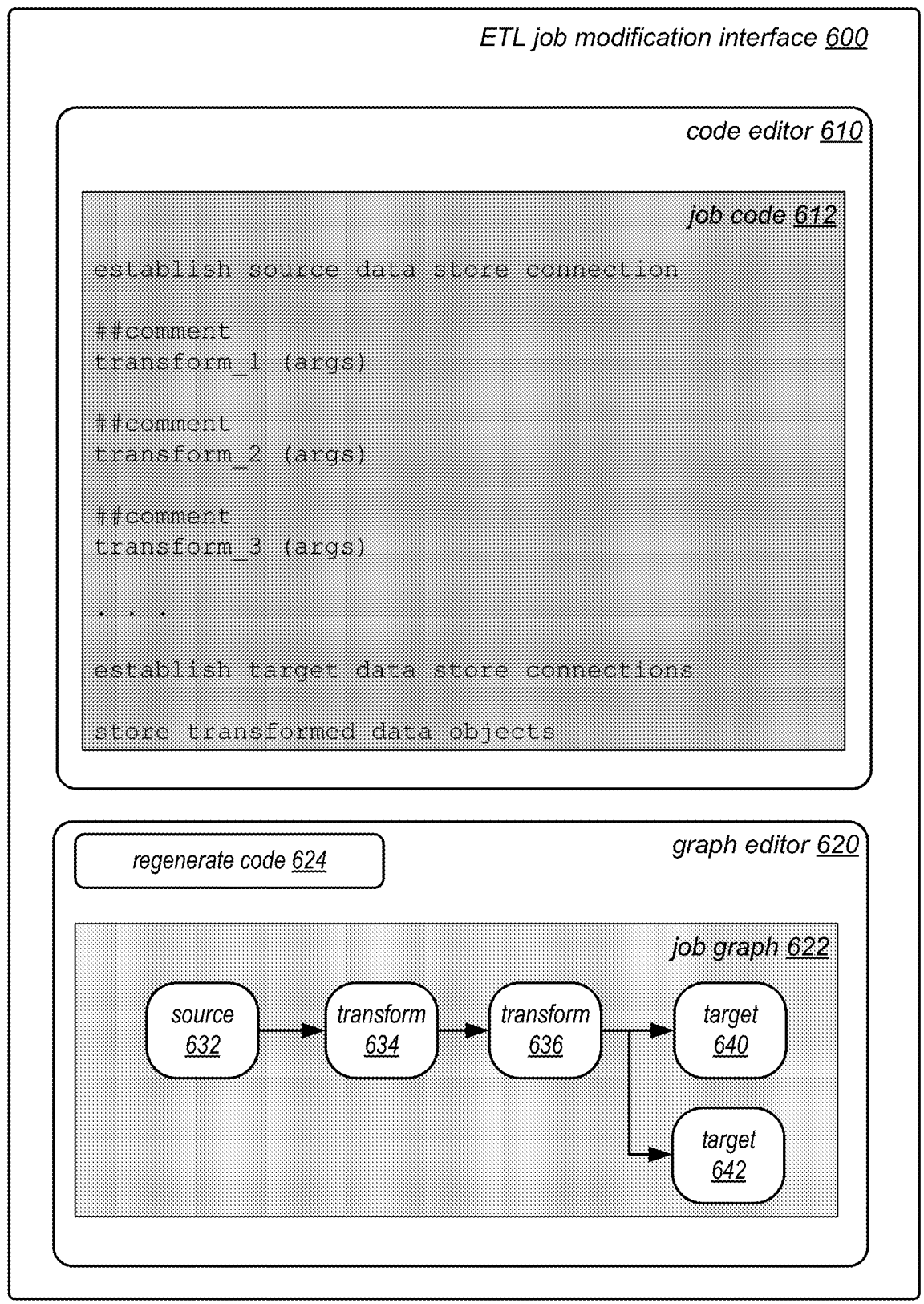
FIG. 6 is an example graphical user interface for modifying an ETL job, according to some embodiments.

FIG. 6 is an example graphical user interface for modifying an ETL job, according to some embodiments. As noted above, interface 310 may implement, serve, or otherwise provide a graphical user interface for users. Code that is generated for a transformation job by ETL service 220 may be displayed for editing along with a graph of the job. For example, ETL job modification interface 600 may implement code editor 610 to provide users with a graphical based text editing tool for displayed job code 612. Text may be selected, overwritten, deleted, added to or allow for any other textual edits to be performed. User interface element 614 may be selected to invoke a request to update the job stored in job storage 350 with changes made in code editor 610. For example, parameter value changes made to job code 612 may be saved to job store 350 upon selection of update job element 614. In some embodiments, comment portions that indicate the transformations may be indicated or locked for editing (in order to preserve the record of the transformation for graph generation. The comments may be updated when the transformations are edited or regenerated. In other embodiments, the comments may be directly edited by a user. For example, they user may edit the comments to supply additional information for graph generation.

Graph editor 620 may be implemented as part of ETL job modification interface 600 in some embodiments to provide an interactive interface for modify a job graphically. Job graph 622 may be generated and displayed. For example, as illustrated in FIG. 6, job graph 622 may include a source data object 632, transforms 634 and 636, and targets of the ETL job, 640 and 642. Users may select various ones of the displayed elements to apply changes, add or remove elements, change input values or parameters, or make any other ETL job edit. User interface element 624 may be selected to generate an updated version of job code 612 based on edits perform via graph editor 620. For example, if a transformation is removed from job graph 622, then the corresponding code may be removed in job code 612 upon selecting regenerate code 624.

Note that the previous example of a graphical use interface is not intended to be limiting. Various other combinations or arrangements of graphical user interface elements, such as popup menus, drop down boxes, on hover displays, or any other user interface features may implemented to provide the various interface features discussed above with regard to FIGS. 5A-6.

Figure 7:
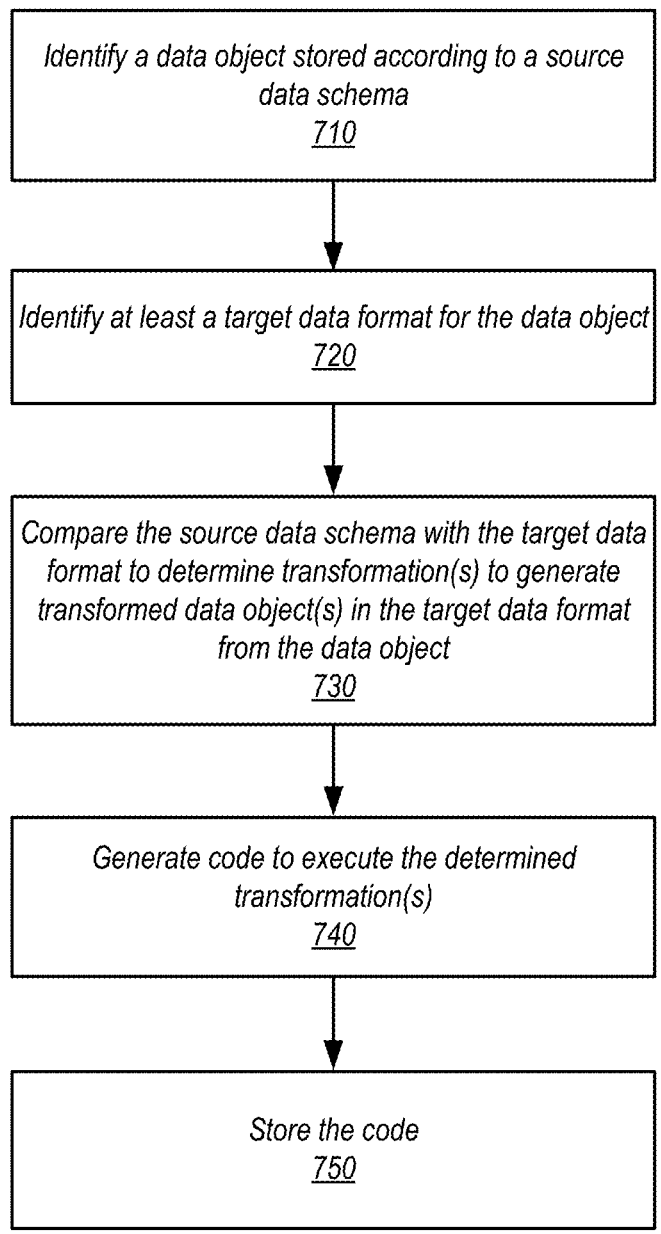
FIG. 7 is a high-level flowchart illustrating methods and techniques to implement generating data transformation workflows, according to some embodiments.

Although FIGS. 2-6 have been described and illustrated in the context of an ETL service, the various techniques and components illustrated and described in FIGS. 2-6 may be easily applied to other data access or management systems in different embodiments that may facilitate transformation of data from one data format to another. As such, FIGS. 2-6 are not intended to be limiting as to other embodiments of a system that may implement generating data transformation workflows. FIG. 7 is a high-level flowchart illustrating methods and techniques to implement generating data transformation workflows, according to some embodiments. Various different systems and devices may implement the various methods and techniques described below, either singly or working together. For example, an ETL service such as described above with regard to FIGS. 2-6 may be configured to implement the various methods. Alternatively, a combination of different systems and devices, such as a storage subsystem that manages access to data stored in directly attached storage devices. Therefore, the above examples and or any other systems or devices referenced as performing the illustrated method, are not intended to be limiting as to other different components, modules, systems, or configurations of systems and devices.

As indicated at 710, a data object stored according to a source data schema may be identified. For example, in one embodiment a request to generate a data transformation workflow may include an identifier for the data object (e.g., an object name, number, or location, such as a file path). The request may include the source data schema, as well as source data format or an identifier for the source data schema. In another embodiment, another data store may store the source data schema information for the data object, such as a metadata store like data catalog 360 discussed above with regard to FIGS. 3 and 4. A request may be made to the data store to retrieve the data schema information as well as other information about the source data object, like data format. As indicated at 720, at least a target data format for the data object may be identified, in some embodiments. For instance, the same request to generate the data transformation workflow or a separate request may include the information for the target data format (e.g., file type). In some embodiments, the target data schema may be identified). In some embodiments, a metadata store, such as data catalog 360, may be accessed using an identifier for the target data format or schema.

As indicated at 730, the source data schema may be compared with the target data format (and/or target data schema) to determine the transformation(s) to generate one or more transformed data objects stored in the target data format (and/or target data schema) from the data object, in some embodiments. For example, the target data format may be evaluated to determine the various transforms to be performed to change the encoding of the data object to be written according to the target data format (e.g., from JSON to Parquet). In another example, the target data schema may be parsed or otherwise evaluated to determine the resulting characteristics of data stored in the target data schema (e.g., number of columns, data types of columns, data contained within the columns, etc.). These characteristics may then be evaluated with respect to the source data schema, to determine what data is needed from the source data schema to produce the characteristic. For example, the comparison may determine mappings between data columns found in the target data format and the source data format. Selection of transformation(s) may be complete when each characteristic can be achieved by the selected transformation(s). In one embodiment, different collections of one or more transformations may be compared with the source data format and target data format, in order to select a best matching workflow.

In one embodiment, rules-based decisions for comparing data formats and selecting transformations may be implemented. For example, if the source data format is a semi-structured data format, and the target data format is a structured data format, then a subset of decision making rules for semi-structured to structured data format transformations may be performed to compare and select transformations. In this way, comparison and selection of transformation(s) may be tailored to the data formats in question (instead of examining all possible transformations for different data formats). Rules-based decisions and other heuristics for selecting transformations may be updated in response to feedback received from users, in at least some embodiments. For example, if a same modification is applied to the same transformation when perform a comparison between the source data format and the target data format, then a rule may be created or modified to include the edit as part of the transformation (or code generated therefrom).

Many different types of transformations may be identified based on the comparison. For example, a transformation may be identified that drops one or more fields, values, or items form the data object. A transformation may be performed to convert data into a relational data format (e.g., converting lists, items or attributes, into row entries with respective column values). Another transformation that may be implemented, in some embodiments, may rename a column, field, or attribute. A transformation may select particular fields from the data object or split fields into two different frames, locations, fields, or attributes. Transformations may split rows, entries, or items into separate rows, entries, or items. Transformations may unbox or box data values, like strings. Transformations may aggregate or combine data values. Transformations may reduce the fidelity of data values by converting, rounding, truncating or modifying data values. Custom data values (e.g., that combine values of multiple different types) may be identified and created or broken apart by transformations.

An ordering of the transformations may be determined, in some embodiments, by evaluating dependencies amongst the transformations. For example, transformations that rely upon generating a data value for a new column based on 2 other columns (e.g., SUM (col A, col B)) may be dependent upon a transformation that maps columns from the data object in the source data format to col A and col B of the target data schema. In some embodiments, the ordering of transformations may be constructed like a directed acyclic graph (DAG) to prevent code generation errors resulting in infinite loops or other inescapable states from occurring.

As indicated at 740, code may be generated to execute the identified transformation(s). A code library or other knowledge base may be maintained to map identified transformations into source code that can be compiled and executed to perform the transformation(s). For example, each transformation may be mapped to a particular function or class in the code library and the mapped function or class may be copied into the source code file generated to perform the transformation(s). The arguments, input values, output values, or other parameters may be determined for the transformations based on the determined ordering of transformations (e.g., pass in the modified entry or row from the previous transformation) or the underlying rational for the transformation (e.g., map values from column A in data object to column D in transformed data object(s)).

The generated code may then be stored, as indicated at 750. For example, a code or job repository, like ETL job store 450 in FIG. 3 above may store the code. The code may be subsequently executed or modified, as discussed above.

In embodiments that allow for transformation of a data object to a target data schema without specifying the target data format, a selection of target data format may be performed. For example, the transformations to generate transformed data object(s) in a target data schema may be identified (e.g., merge, split, drop, etc.), and then evaluated to determine which data format optimally stores data that would be generated as a result of the identified operations. If, for instance, the transformation involves generating a new data value (e.g., an average value) based on source data values, the data format may be selected based on whether the data format supports the data type for the new data value (e.g., supports a double or a float, scientific notation, etc.).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
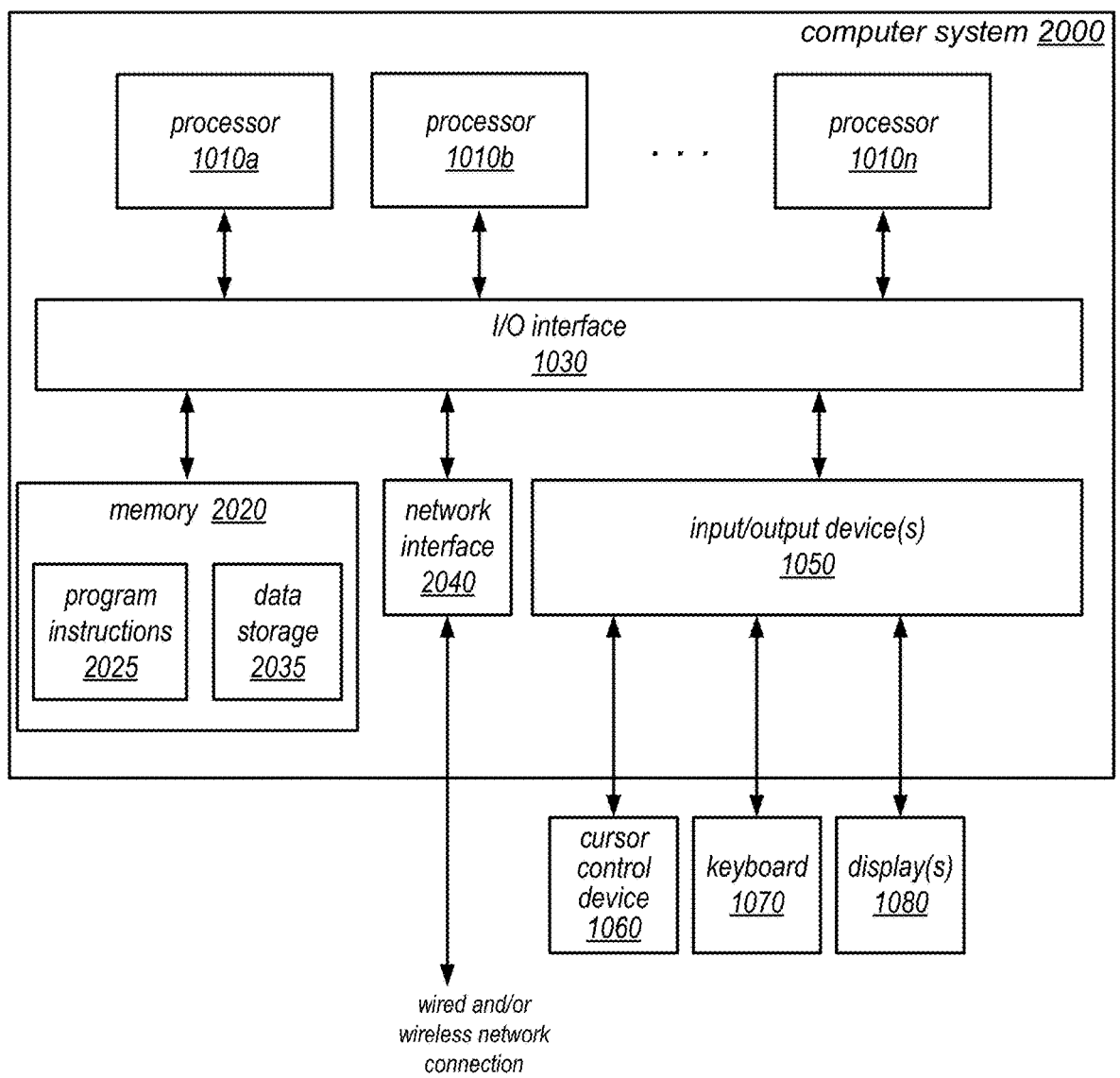
FIG. 8 illustrates an example system configured to implement the various methods, techniques, and systems described herein, according to some embodiments.

Embodiments of generating data transformation workflows as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/ output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a ETL system may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory to store program instructions that, if executed, cause the at least one processor to perform a method, comprising:
in response to a request to automatically create an Extract Transform Load (ETL) job for a data object:
obtaining a source data schema for the data object identified in the request, wherein the data object is stored in a first data store according to the source data schema;
obtaining a target data format for the data object based on the request;
automatically determining one or more differences from comparing the source data schema with the target data format;
using the differences between the source data schema and the target data format to determine one or transformations to apply to the data object as part of executing the ETL job to generate one or more transformed data objects stored according to the target data format;

automatically generating code to perform the ETL job that executes the one or more transformations; and making the code available for modification via access to the code in a second data store.

2. The system of claim 1, wherein the method further comprises:

generating a graph of the one or more transformations; and providing the graph for display via a graphical user interface.

3. The system of claim 1, wherein the method further comprises:

providing at least some of the code via an interface;

receiving, via the interface, a request to modify the at least some code; and updating the code in the second data store according to the requested modification.

4. The system of claim 1, wherein the first data store is a data storage service offered by a provider network, wherein the at least one processor, the memory, and the second data store are implemented as part of an extraction transformation loading (ETL) service offered by the provider network, and wherein the data object and the target data format are identified according to one or more requests received via network-based interface for the ETL service.

5. A method, comprising:

performing by one or more computing devices:

in response to a request to automatically create an Extract Transform Load (ETL) job for a data object:

obtaining a source data schema for the data object identified in the request, wherein the data object is stored in a first data store according to the source data schema;

obtaining a target data format for the data object based on the request;

automatically determining one or more differences from comparing the source data schema with the target data format;

using the differences between the source data schema and the target data format to determine one or transformations to apply to the data object as part of executing the ETL job to generate one or more transformed data objects stored according to the target data format;

automatically generating code to perform the ETL job that executes the one or more transformations; and making the code available for modification via access to the code in a second data store.

6. The method of claim 5, further comprising:

obtaining the code from the second data store;

executing the code with respect to the data object to perform the ETL job to generate the transformed data objects; and storing the transformed data objects in the first data store or a third data store.

7. The method of claim 5, further comprising:

generating a graph of the one or more transformations; and providing the graph for display via a graphical user interface.

8. The method of claim 7, further comprising:

receiving, via the graphical user interface, a request to modify the graph of the transformations; and modifying at least a portion of the code according to the modification of the graph of the transformations.

9. The method of claim 5, wherein generating the code to perform the ETL job that executes the one or more transformations comprises including one or more comments in the code that indicate the one or more transformations; and wherein generating the graph of the one or more transformations comprises parsing the code to determine the one or more transformations indicated by the one or more comments.

10. The method of claim 5, wherein the automatically determining the one or more differences from comparing the source data schema with the target data format further comprises comparing the source data schema with a target data schema.

11. The method of claim 5, wherein the method further comprises:

providing at least some of the code via an interface;

receiving, via the interface, a request to modify the at least some code; and updating the code in the second data store according to the requested modification.

12. The method of claim 11, further comprising:

obtaining the updated code from the second data store;

executing the updated code with respect to the data object to generate the transformed data objects; and storing the transformed data objects in the first data store or a third data store.

13. The method of claim 5, wherein the first data store is a data storage service offered by a provider network, wherein the at least one processor, the memory, and the second data store are implemented as part of an extraction transformation loading (ETL) service offered by the provider network, and wherein the data object and the target data format are identified according to one or more requests received via network-based interface for the ETL service.

14. A non-transitory, computer-readable storage medium, storing program instructions that when executed by one or more computing devices cause the one or more computing devices to implement:

in response to a request to automatically create an Extract Transform Load (ETL) job for a data object:

obtaining a source data schema for the data object identified in the request, wherein the data object is stored in a first data store according to the source data schema;

obtaining a target data format for the data object based on the request;

automatically determining one or more differences from comparing the source data schema with the target data format;

using the differences between the source data schema and the target data format to determine one or transformations to apply to the data object as part of executing the ETL job to generate one or more transformed data objects stored according to the target data format;

automatically generating code to perform the ETL job that executes the one or more transformations; and making the code available for modification via access to the code in a second data store.

15. The non-transitory, computer-readable storage medium of claim 14, wherein the determining the one or more differences from comparing the source data schema with the target data schema comprises obtaining the source data schema and the target data schema from a metadata store.

16. The non-transitory, computer-readable storage medium of claim 14, storing further program instructions that cause the one or more computing devices to further implement:
   generating a graph of the one or more transformations; and
   providing the graph for display via a graphical user interface.

17. The non-transitory, computer-readable storage medium of claim 14, storing further program instructions that cause the one or more computing devices to further implement:
   providing at least some of the code via an interface;
   receiving, via the interface, a request to modify the at least some code; and
   updating the code in the second data store according to the requested modification.

18. The non-transitory, computer-readable storage medium of claim 17, storing further program instructions that cause the one or more computing devices to further implement:
   obtaining the updated code from the second data store;
   executing the updated code with respect to the data object to generate the transformed data objects; and
   storing the transformed data objects in the first data store or a third data store.

19. The non-transitory, computer-readable storage medium of claim 14, storing further program instructions that cause the one or more computing devices to further implement identifying a target data format for the transformed data objects, wherein the one or more transformations further generate the one or more transformed data objects to be stored according to the identified target data format.

20. The non-transitory, computer-readable storage medium of claim 14, wherein, in determining the one or more differences from comparing the source data format with the target data format, the program instructions cause the one or more computing devices to implement:
   identifying a plurality data values stored separately in the data object according to the source data format; and
   selecting as one of the determined transformations a transformation that stores together the data values in the transformed data objects.

* * * * *